United States Patent
Fukuda

(10) Patent No.: US 7,158,142 B1
(45) Date of Patent: Jan. 2, 2007

(54) DISPLAY CONTRAST ADJUSTMENT METHOD AND DEVICE HAVING DISPLAY CONTRAST ADJUSTMENT FUNCTION

(75) Inventor: Ryoji Fukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,691

(22) Filed: May 11, 2000

(30) Foreign Application Priority Data

May 17, 1999 (JP) .................................. 11-135471
Apr. 28, 2000 (JP) ............................. 2000-130575

(51) Int. Cl.
*G09G 5/00* (2006.01)

(52) U.S. Cl. ....................................... 345/581; 345/617

(58) Field of Classification Search ................ 345/204, 345/699, 271, 332, 95, 87, 581, 617, 619, 345/428, 212; 348/14.07, 14.12; 358/1.6, 358/2.1; 715/764; 349/69
See application file for complete search history.

(56) References Cited

U.S. PATENT DOCUMENTS

| | | | | |
|---|---|---|---|---|
| 5,162,785 A | * | 11/1992 | Fagard ........................ | 340/784 |
| 5,359,531 A | * | 10/1994 | Iwamoto et al. ............ | 700/146 |
| 5,404,150 A | * | 4/1995 | Murata ........................ | 345/95 |
| 5,422,656 A | * | 6/1995 | Allard et al. ................ | 345/173 |
| 5,455,083 A | * | 10/1995 | Noh et al. ................... | 428/1.31 |
| 5,567,030 A | * | 10/1996 | Shin ............................. | 353/85 |
| 5,589,960 A | * | 12/1996 | Chiba et al. .................. | 349/76 |
| 5,597,626 A | * | 1/1997 | Eguchi ........................ | 428/1.4 |
| 5,799,106 A | * | 8/1998 | Mooney et al. ............. | 382/172 |
| 5,801,768 A | * | 9/1998 | Sudo et al. .................. | 348/191 |
| 6,215,549 B1 | * | 4/2001 | Suzuki et al. ............... | 356/338 |
| 6,249,268 B1 | * | 6/2001 | Tachibana et al. ............ | 345/89 |
| 6,353,291 B1 | * | 3/2002 | Borgogno et al. ........ | 315/169.3 |
| 6,477,821 B1 | * | 11/2002 | Bois ............................. | 53/412 |
| 6,504,950 B1 | * | 1/2003 | Murashita et al. .......... | 382/162 |

FOREIGN PATENT DOCUMENTS

JP 7-110663 4/1995

* cited by examiner

*Primary Examiner*—Richard Hjerpe
*Assistant Examiner*—Abbas Abdulselam
(74) *Attorney, Agent, or Firm*—Fitzpatrick, Cella, Harper and Scinto

(57) ABSTRACT

An information processing apparatus controls display contrast of a display screen based on a stored display contrast value. The information processing apparatus includes a display screen, an input unit for inputting data, a storage unit for storing a display contrast value, a unit for adjusting the display contrast of the display screen based on the stored display contrast value, a measuring unit for measuring the time after the completion of data input from the input unit while the display contrast is being adjusted, a value changing unit for changing the stored display contrast value stored in the storage unit after a first predetermined period of the time measured by the measuring unit elapses, and a changing unit for changing the display contrast of the display screen based on the display contrast changed by the value changing unit.

33 Claims, 5 Drawing Sheets

DISPLAY CONTRAST ADJUSTMENT METHOD AND DEVICE HAVING DISPLAY CONTRAST ADJUSTMENT FUNCTION

BACKGROUND OF THE INVENTION

1. Field of the Invention

The present invention relates to methods for adjusting the contrast of a display device and to devices having a function for adjusting the contrast of the display device, and more particularly relates to a method and to a device having a function for adjusting the display contrast of a liquid crystal display (LCD) or the like incorporated in a portable information apparatus, such as an electronic notebook or a personal digital assistant (PDA).

2. Description of the Related Art

Hitherto, in a portable information apparatus or the like having an LCD, such as an electronic notebook or a PDA, adjustment of the contrast of the LCD is sometimes required when the battery is changed. In order to reduce the number of parts and the production cost of the apparatus, instead of an external mechanical contrast-adjustment member, an electronic contrast-adjustment member has been used to adjust the contrast of the LCD. However, since the electronic contrast adjustment member is set using a graphical user interface (GUI) icon displayed on the LCD, a confirmation operation or the like cannot be performed in a case in which the screen is displayed at an inappropriate contrast.

To solve the problems, there has been proposed "Display State Setting Apparatus" as disclosed in Japanese Patent Laid-Open No. 7-110663 in which, when a display device is turned on, the display driving voltage level is automatically changed and is set by stopping the change in the driving voltage by a predetermined operation, such as by a key input.

However, in the above conventional technique, since a user can only stop the progressive change in the display driving voltage level, an appropriate contrast for the display device is difficult to set.

Furthermore, since it is desired to adjust the contrast of the display device not only during the start-up processing but also after a long period of use of the display device, the display contrast adjustment should be performable even after the start-up processing and should be easily performed.

SUMMARY OF THE INVENTION

The present invention is made in view of the foregoing problems. Accordingly, it is a first object of the present invention to provide a method and device for adjusting the display contrast of a display which has improved operability and which allows the display contrast to be easily set again.

It is a second object of the present invention to provide a storage medium storing a control program for controlling the device according to the present invention.

To this end, according to a first aspect of the present invention, there is provided an information processing apparatus for controlling display contrast of a display screen based on a stored display contrast value. The information processing apparatus includes a display screen, an input unit for inputting data, a storage unit for storing a display contrast value, a unit for adjusting the display contrast of the display screen based on the stored display contrast value, a measuring unit for measuring the time after the completion of data input from the input unit while the display contrast is being adjusted, a value changing unit for changing the stored display contrast value stored in the storage unit after a first predetermined period of the time measured by the measuring unit elapses, and a changing unit for changing the display contrast of the display screen based on the display contrast changed by the value changing unit.

According to a second aspect of the present invention, there is provided a contrast adjustment method controlling the display contrast of a display screen based on a stored display contrast value. The contrast adjustment method includes an adjusting step for adjusting the display contrast of the display screen based on the stored display contrast value, a measuring step for measuring the time after the completion of input from an input unit while the display contrast is being adjusted, a value changing step for changing the stored display contrast value when a first predetermined period of time measured in the measuring step elapses, and a changing step for changing the display contrast of the display screen based on the display contrast changed in the value changing step.

According to a third aspect of the present invention, there is provided a computer-readable storage medium containing a contrast control program for performing a process which controls the display contrast of a display screen based on a display contrast value stored in a storage unit. In the storage medium, the contrast control program includes an adjusting module for adjusting the display contrast of the display screen based on the stored display contrast value, a measuring module for measuring the time after the completion of input from an input unit while the display contrast is being adjusted, a value changing module for changing the display contrast value stored in the storage unit when a first predetermined period of the time measured by the measuring module elapses, and a changing module for changing the display contrast of the display screen based on the display contrast changed by the value changing module.

Further objects, features, and advantages of the present invention will become apparent from the following description of the preferred embodiments with reference to the attached drawings.

DESCRIPTION OF THE PREFERRED EMBODIMENTS

Embodiments of the present invention are described below with reference to the accompanying drawings.

First Embodiment

The first embodiment of the present invention is described with reference to FIGS. 1 to 4.

Figure 1:
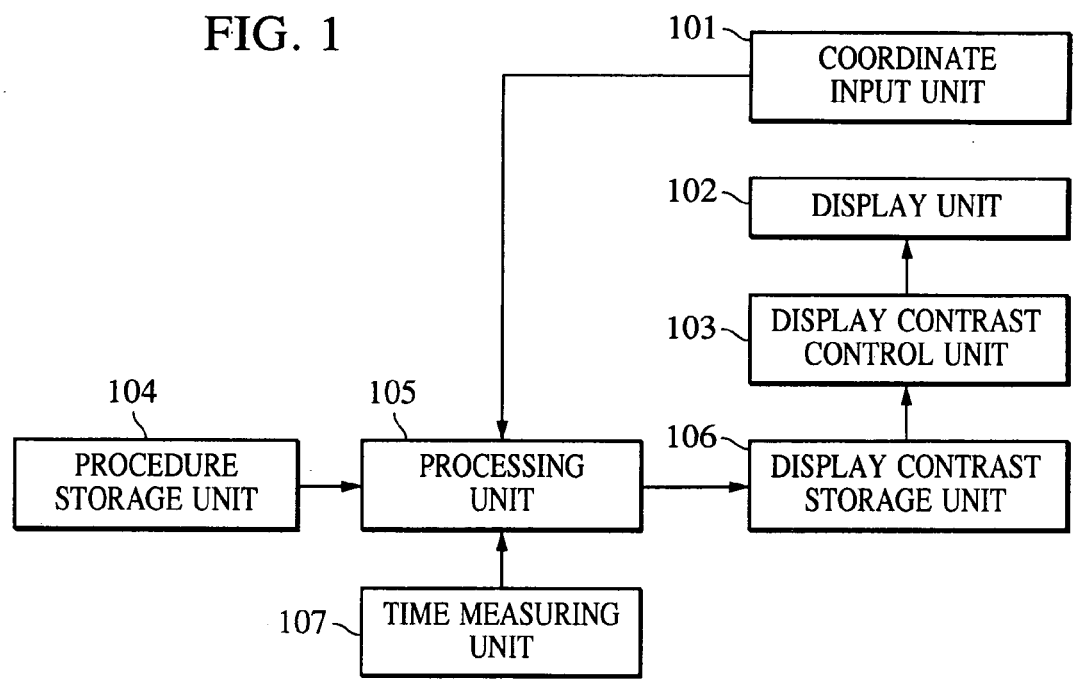
FIG. 1 is a block diagram showing the construction of an information processing apparatus having a display contrast adjustment function according to the present embodiment.

FIG. 1 shows a block diagram of the construction of an information processing apparatus having a display contrast adjustment function according to the present embodiment. The information processing apparatus has a coordinate input unit 101, a display unit 102, a display contrast control unit 103, a procedure storage unit 104, a processing unit 105, a display contrast storage unit 106, and a time measuring unit 107.

Each of the elements shown in block outline in the figures is well known per se, and a specific type of construction is not critical to carrying out the invention or to a disclosure of the best mode for carrying the invention.

The coordinate input unit 101 receives information regarding coordinates of the display unit 102 and inputs it to the processing unit 105. The processing unit 105 sets a display contrast based on data from the coordinate input unit 101 and the time measuring unit 107 in accordance with a program stored in the procedure storage unit 104 and stores the display contrast value in the display contrast storage unit 106. The display contrast control unit 103 receives the display contrast value stored in the display contrast storage unit 106 and changes the display contrast of the display unit 102.

A user adjusts the display contrast by inputting a more specific display contrast value from the coordinate input unit 101 based on the display contrast at which the display unit 102 is displaying so that the display unit 102 displays at an optimal display contrast.

Figure 2:
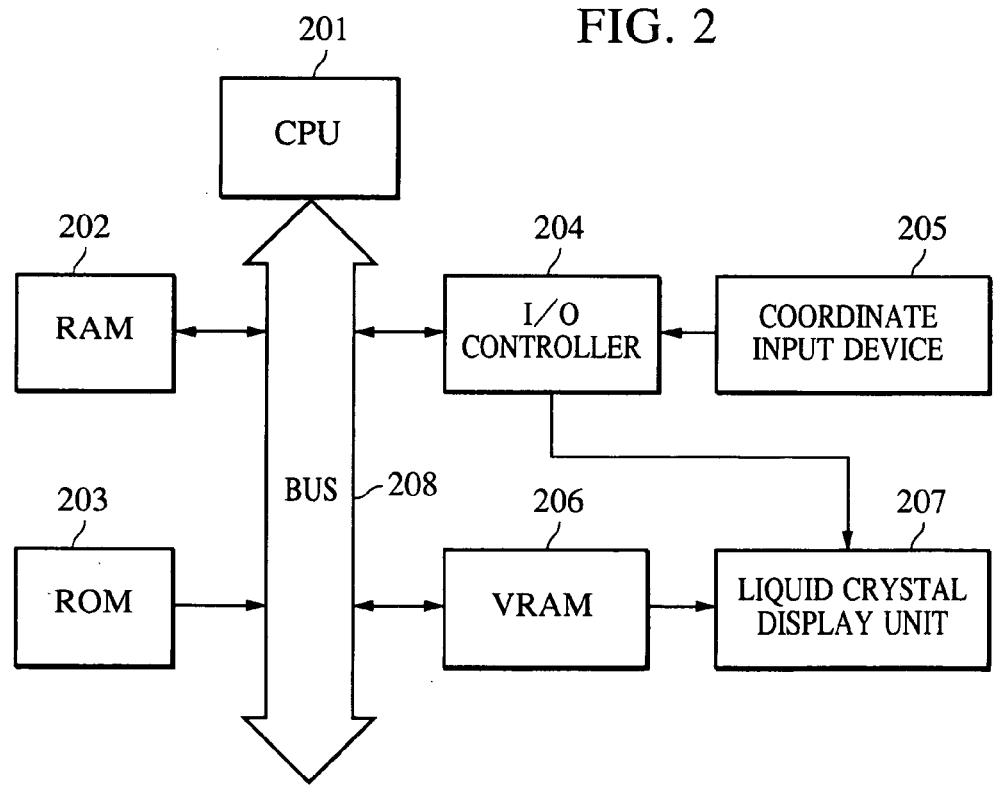
FIG. 2 is a block diagram showing the hardware configuration of the information processing apparatus according to the present embodiment.

FIG. 2 shows a hardware configuration of the information processing apparatus according to the present embodiment. In FIG. 2, the information processing apparatus has a central processing unit (CPU) 201, a random access memory (RAM) 202, a read only memory (ROM) 203, an input/output (I/O) controller 204, a coordinate input device 205, a video random access memory (VRAM) 206, a liquid crystal display (LCD) unit 207, and a bus 208.

The I/O controller 204 and the coordinate input device 205 together form the coordinate input unit 101. To be more specific, the coordinate input unit 101 includes a transparent thin film resistance digitizer and an integrated circuit (IC) for controlling the digitizer which are integrated with the liquid crystal display unit 207.

The VRAM 206 and the LCD unit 207 form the display unit 102. The I/O controller 204 also forms the display contrast control unit 103. The ROM 203 forms the procedure storage unit 104. The procedure storage unit 104 contains a computer-readable program based on a flowchart shown in FIG. 3, which is stored in the ROM 203. The CPU 201 forms the processing unit 105. Registers provided in the I/O controller 204 form the display contrast storage unit 106. Data stored in the registers of the I/O controller 204 is input to the CPU 201 via the bus 208. A built-in internal clock of the CPU 201 is the time measuring unit 107.

In the information processing apparatus having the display contrast adjustment function according to the present embodiment, operations up to a display contrast setting menu are described.

Figure 5:
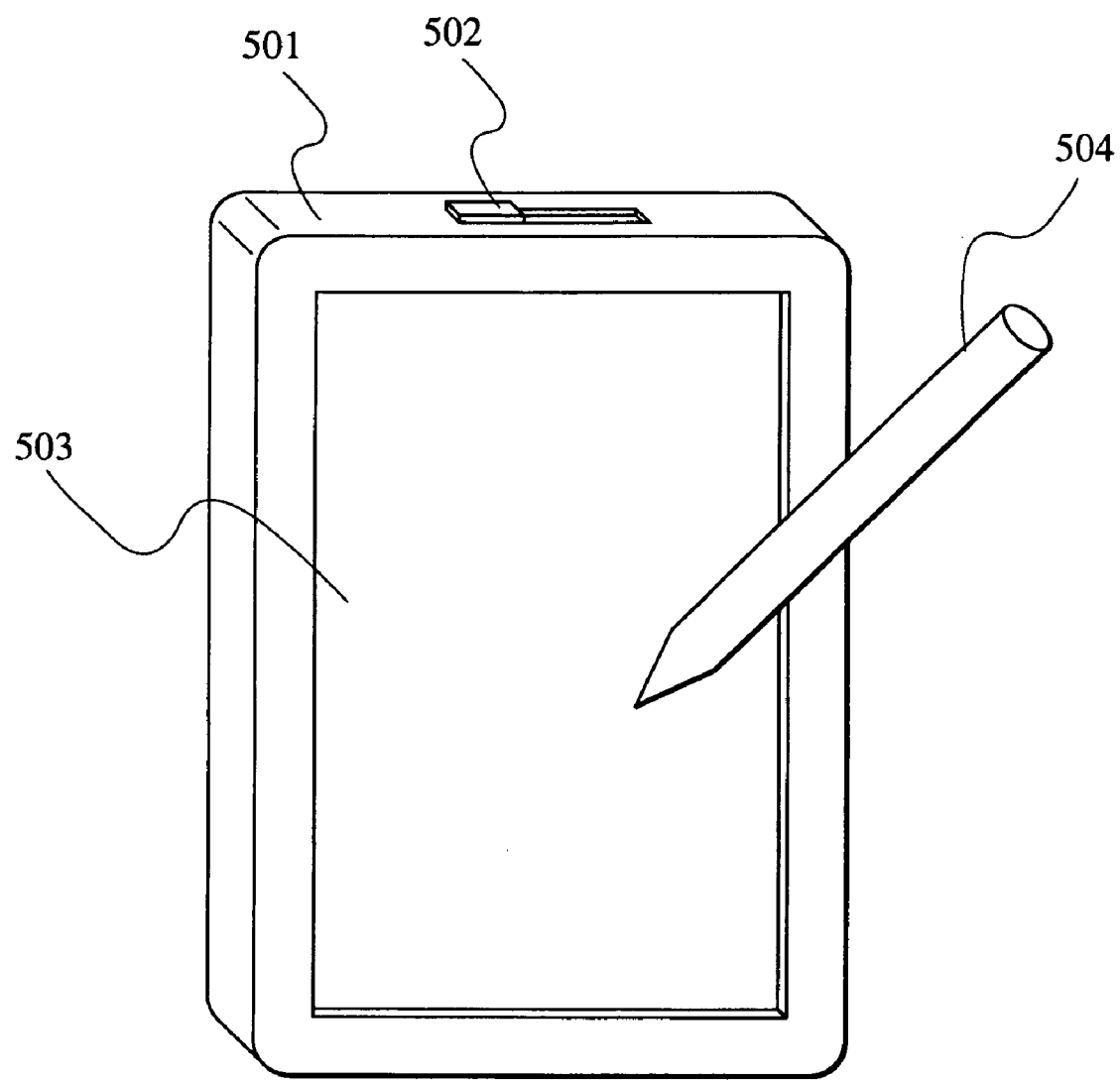
FIG. 5 is an illustration of the appearance of the information processing apparatus according to the first embodiment of the present embodiment.

FIG. 5 shows the appearance of the information processing apparatus according to the present embodiment when the information processing apparatus is a portable information apparatus.

A portable information apparatus 501 has a power switch 502, and a coordinate input digitizer 503 which is integrated with the LCD unit 207. Only these two parts are provided as operational members for a user whereby the LCD contrast can be adjusted, without using a contrast-adjustment member or the like.

When the user turns on a portable information apparatus by operating a power switch, and an LCD unit is set at an inappropriate LCD contrast, the screen remains blank (e.g., a white screen or a black screen), which causes difficulties in subsequent operations using an input stylus.

Therefore, the LCD contrast adjustment operation is necessary when a portable information apparatus is turned on. However the operability of such an apparatus, in which the user is required to adjust the LCD contrast each time it is turned on, is low.

Therefore, normally, a preset adjustment value is stored in a nonvolatile storage medium or the like. The next time the portable information apparatus is turned on, it reads the preset adjustment value from the nonvolatile storage medium, thereby preparing for normal operations.

However, there are some cases in which an LCD contrast adjustment must be performed when the portable information apparatus is turned on due to an inappropriate input, aging of the LCD, or the like. Thus, after the portable information apparatus 501 is turned on, process up to the display contrast adjustment processing is described with reference to FIG. 6.

Initially, when the portable information apparatus 501 is turned on, the process proceeds to step S601. At step S601, the process determines whether or not the portable information apparatus 501 is turned on while coordinates are input. If the result of the determination is affirmative, the process proceeds to step S602; otherwise, the process proceeds to step S604.

At step S602, the process performs the display contrast adjustment processing and proceeds to step S603 in accordance with a request to exit from the display contrast adjustment processing or a power-off request from the apparatus 501. At step S603, if the apparatus 501 is requested to be turned off, the process causes the apparatus 501 to be turned off; otherwise, the process proceeds to step S604.

At step S604, the process follows normal operations of the apparatus 501, and detailed description thereof being omitted. In accordance with a power-off request from the apparatus 501 or a request for display contrast adjustment processing, the process stops the normal operation in step S604 and proceeds to step S605.

At step S605, if the apparatus 501 is requested to be turned off, the process causes the apparatus 501 to be turned off (which causes the process to be terminated); otherwise, the process proceeds to step S602.

Figure 3:
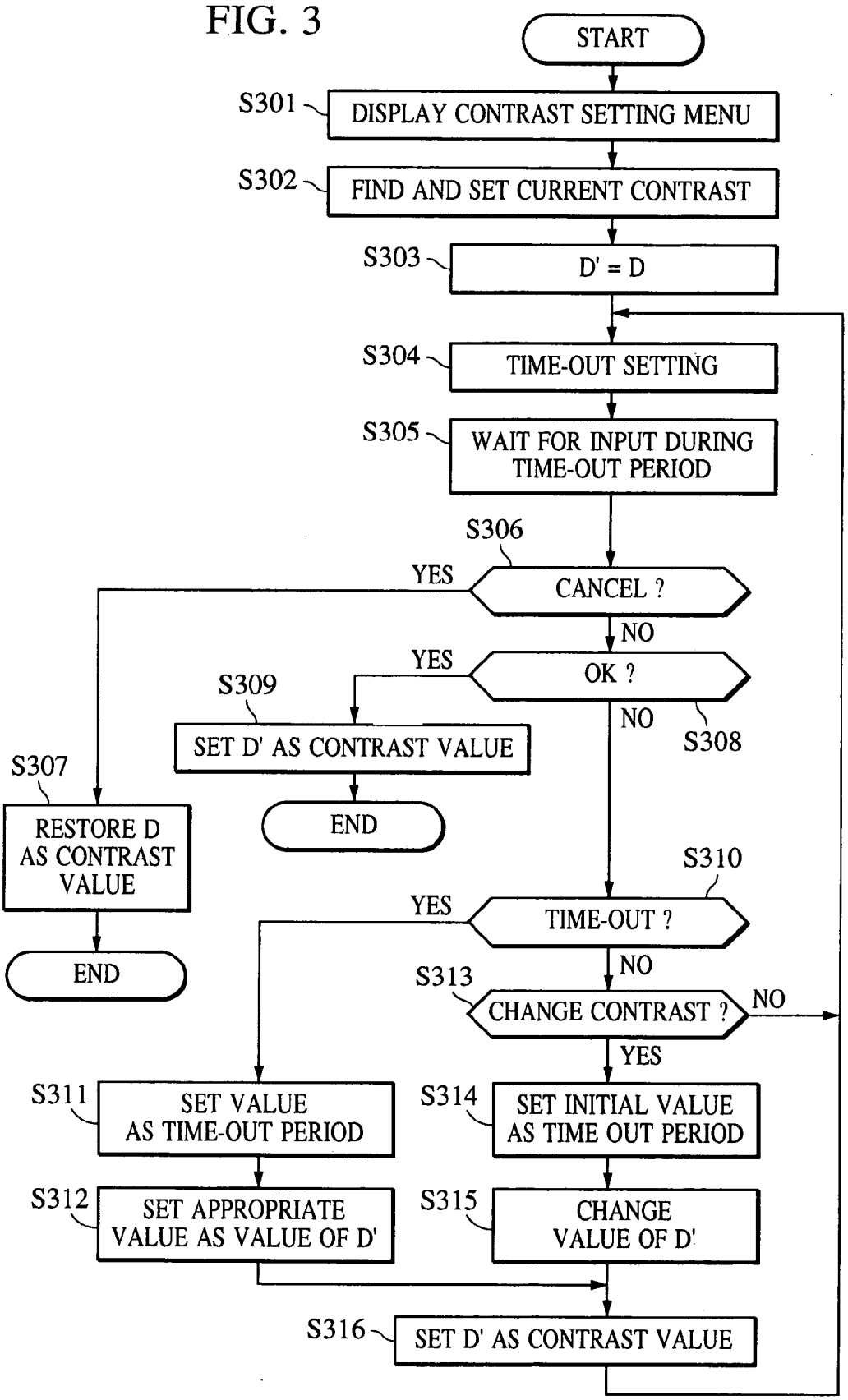
FIG. 3 is a flowchart showing processing flow in the information processing apparatus according to a first embodiment of the present invention.

Operations of the information processing apparatus according to the present embodiment are described in conjunction with the flowchart shown in FIG. 3.

Figure 6:
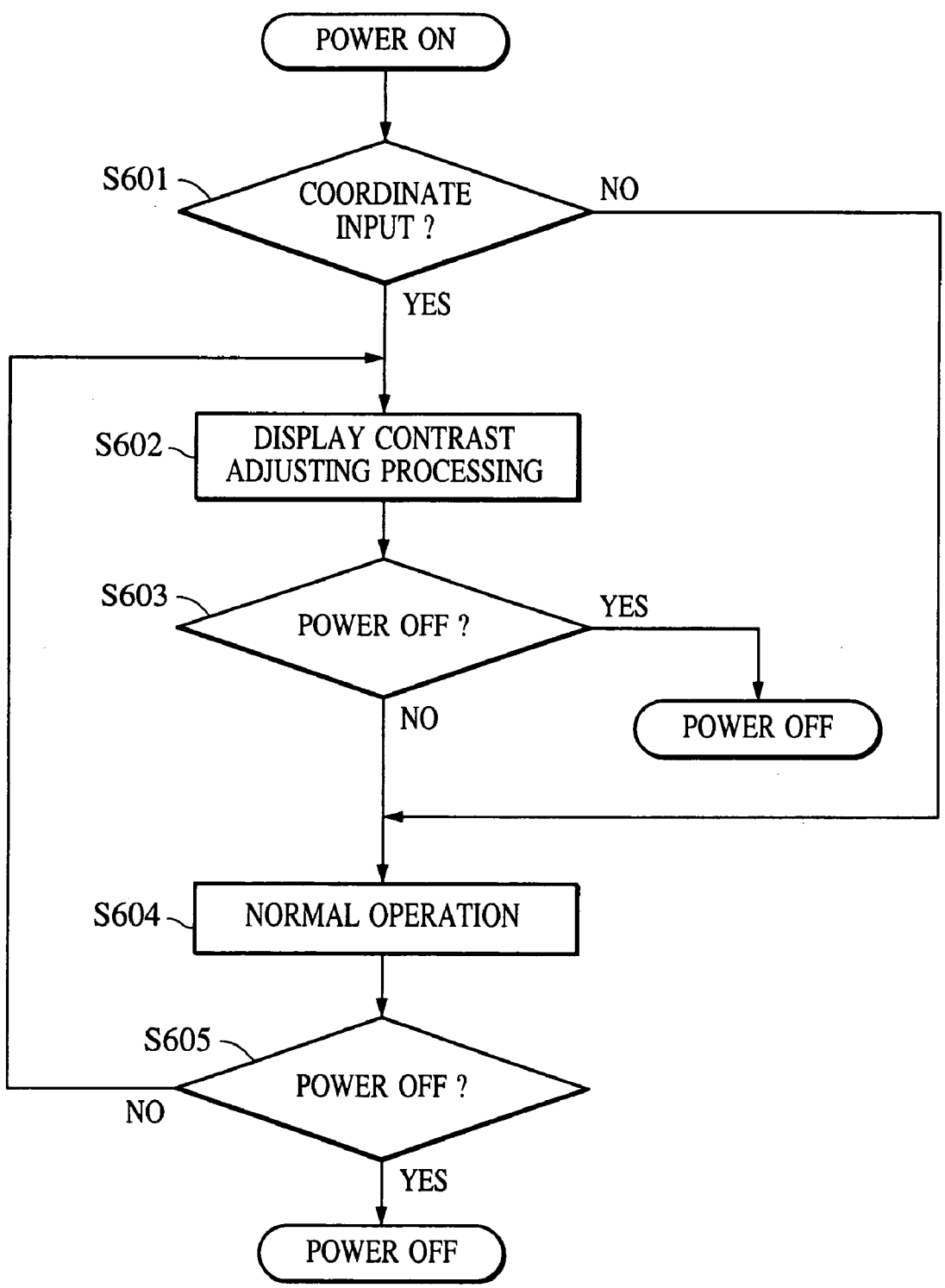
FIG. 6 is a flowchart showing processing up to display contrast adjustment processing in the information processing apparatus according to the first embodiment of the present invention.

At step S301, the processing unit 105 (the CPU 201) initially displays the display contrast setting menu when the display contrast adjustment processing is activated in accordance with the request for the display contrast adjustment procedure during the course of start-up processing as shown in FIG. 6, or during the course of normal operations.

At step S302, the process reads the current LCD contrast and sets it as an initial contrast value D. At step S303, the process also sets the initial contrast value D as a newly-set contrast value D'. At step S304, the process sets an initial time-out period for the time measuring unit 107.

The time-out period serves as a period for a signal to the processing unit 105, such as an interrupt signal, to occur when the waiting state for the coordinate input continues for a predetermined period. The time-out period also serves as a period for a user to adjust the LCD contrast as desired. For example, when the time-out period is set to ten seconds, and when no event occurs for at least ten seconds in a subsequent step as described below, the display contrast begins to be automatically changed. This is because when the user mistakenly sets an extreme value for the display contrast, in which the setting operation cannot be performed, the problem can be overcome by waiting for a short time.

At step S305, the process waits for coordinate input during the time-out period. When the coordinate input is entered within the time-out period, or when no coordinate input is entered within the time-out period, the process proceeds to step S306. At step S306, the process determines based on input coordinates, whether or not a "CANCEL" request has been input. If the result of the determination is affirmative, the process proceeds to step S307; otherwise, the process proceeds to step S308.

At step S307, the process restores the initial contrast value D as the LCD contrast and terminates. At step S308, the process determines based on the input coordinates whether or not an "OK" request has been input. If the result of the determination is affirmative, the process proceeds to step S309; otherwise, the process proceeds to step S310.

At step S309, the process sets the newly-set contrast value D' as the LCD contrast and terminates. At step S310, the process determines whether or not the process exits out of the waiting state due to time-out. If the result of the determination is affirmative, the process proceeds to step S311; otherwise, the process proceeds to step S313.

At step S311, the time-out period is changed. It is preferable that the time-out period be smaller than the initial time-out period set at step S304. For example, when one second is set as the time-out period, the display contrast is to be automatically changed every one second. At step S312, an appropriate value is set as the newly-set contrast value D' and proceeds to step S316.

In step S312, the appropriate value is obtained as follows: when the newly-set contrast value D' is below the allowable maximum LCD contrast of the LCD unit 207, the appropriate value is obtained by adding 1 to the newly-set value D'; when the newly-set contrast value D' reaches the allowable maximum LCD contrast, the appropriate value is obtained by subtracting 1 from the newly-set contrast value D'; and when the newly-set contrast value D' reaches the allowable minimum LCD contrast, the appropriate value is obtained by adding 1 to the newly-set contrast value D'.

At step S313, the process determines, based on the coordinate input, whether or not the display contrast adjustment processing has been requested. If the result of the determination is affirmative, the process proceeds to step S314; otherwise, the process proceeds back to step S304.

At step S314, the process restores the value of the initial time-out period as the current time-out period. Accordingly, even though the portable information apparatus 501 is set in a mode in which the LCD contrast automatically changes, when the user requests the display contrast adjustment processing, the time-out period is set to be sufficiently long, which causes the process to substantially exit from the above automatic changing mode.

At step S315 the process sets the LCD contrast as the newly-set contrast value D' and proceeds back to step S304.

By repeating the above steps, the portable information apparatus 501 functions as an information processing apparatus.

Figure 4:
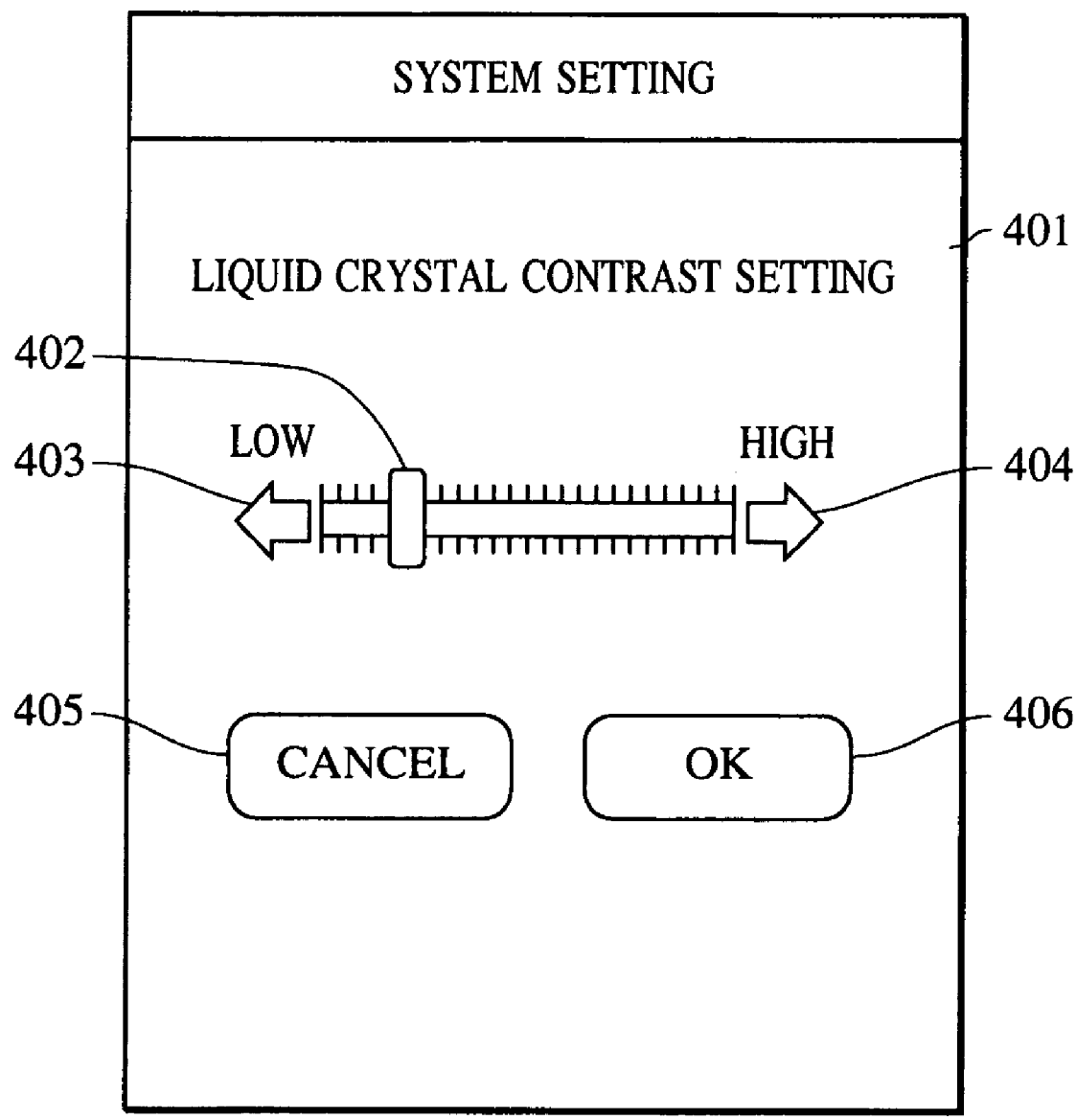
FIG. 4 is an illustration of one example of a screen on the display unit of the information processing apparatus according to the first embodiment of the present invention.

FIG. 4 shows one example of screens on the display unit 102 of the information processing apparatus according to the present invention. In FIG. 4, a screen 401 offers to a user GUI for setting LCD contrast. A slider 402 moves leftward and rightward in accordance with the coordinates of a point on the coordinate input unit 101 touched by an input stylus 504. As the slider 402 moves, the newly-set contrast value D' shown in step S315 or the like in FIG. 3 changes accordingly. The newly-set contrast value D' is also changed using an LCD contrast adjustment button 403 for changing the contrast value toward LOW contrast and an LCD contrast adjustment button 404 for changing the contrast value toward HIGH contrast. A CANCEL button 405 is provided for restoring the initial contrast value to the LCD contrast. An OK button 406 is provided for confirming the setting of the newly-set contrast value.

With the above configurations and operations, since the user can easily adjust the LCD contrast of the information processing apparatus, the operability during the LCD contrast adjustment processing is improved.

Although in the present embodiment, the LCD is used as the display unit, the display unit of the present invention is not limited to the LCD. Other types of displays, such as cathode-ray tube displays, can be used with the present invention. Also, in the present embodiment, the input stylus is used as the coordinate input device. However, the coordinate input device of the present invention is not limited to the input stylus. Other types of coordinate input devices, such as a mouse or a keyboard, may be used with the present invention.

The information processing apparatus according to the present invention loads and executes a control program stored in a storage medium, whereby the above-described functions are realized. The present invention is not limited thereto. A case in which the control program serves as at least a part of an operating system, thereby realizing the functions described in the present embodiment, is also applicable to the present invention.

As a storage medium storing the control program, for example, a floppy disk, a hard disk, an optical disk, a magneto-optical disk, a CD-ROM (compact disk, read only memory), a CD-R (compact disk, recordable), a magnetic tape, a nonvolatile memory card, a ROM chip, or the like may be used.

Second Embodiment

In the Second Embodiment of the present invention, instead of step S312 in FIG. 3 in which an appropriate value is set as the newly-set value D', a step in which the minimum LCD contrast is set as the newly-set value D' when the newly-set value D' becomes the maximum LCD contrast, is applied to the contrast adjustment processing described in the First Embodiment.

According to the Second Embodiment, since the LCD contrast is switched from the maximum LCD contrast to the minimum LCD contrast more quickly than in the first embodiment, the user can set the LCD contrast faster when the minimum LCD contrast is desired.

Third Embodiment

In the Third Embodiment of the present invention, instead of step S312 in which an appropriate value is set as the newly-set value D', a step in which the maximum LCD contrast is set as the newly-set value D' when the newly-set value D' becomes the minimum LCD contrast, is applied to the contrast adjustment processing described in the First Embodiment.

According to the Third Embodiment, since the LCD contrast is switched from the minimum LCD contrast to the maximum LCD contrast more quickly than in the First Embodiment, the user can more quickly set the LCD contrast when the maximum LCD contrast is desired.

According to the present invention, the user can adjust the display contrast at any time (not only during start-up processing). Furthermore, the user can restore the initial contrast value D as the display contrast even after the display contrast is set to have an extreme value. Accordingly, there are advantages in which the display contrast of the information apparatus can be easily adjusted, and furthermore, the operability thereof is improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for controlling display contrast of a display screen based on a stored display contrast value, said information processing apparatus comprising:
   a display screen;
   storage means for storing a display contrast value;
   display control means for displaying display contrast setting information based on the stored display contrast value on said display screen when a display contrast adjustment processing is activated in accordance with a request for a display contrast adjustment procedure;
   input means for inputting, by manipulation of a user, data using the display contrast setting information displayed on said display screen in order to change the display contrast value;
   measuring means for measuring a time of no data input by said input means;
   value changing means for changing the display contrast value stored in said storage means after a first predetermined period of time measured by said measuring means elapses or when the data is inputted by said input means; and
   changing means for changing the display contrast of said display screen based on the display contrast value changed by said value changing means, wherein
   after said changing means changes the display contrast, said measuring means resumes measuring and when a second predetermined period of time measured by said measuring means elapses, said value changing means changes the display contrast value stored in said storage means.

2. An information processing apparatus according to claim 1, wherein said display screen includes a liquid crystal display device.

3. An information processing apparatus according to claim 1, wherein said input means comprises a coordinate input device.

4. An information processing apparatus according to claim 1, wherein the display contrast adjustment processing is performed when the apparatus is supplied with main power.

5. An information processing apparatus according to claim 1, wherein said information processing apparatus is a portable apparatus.

6. An information processing apparatus according to claim 1, wherein said input means consists of a coordinate input device.

7. An information processing apparatus according to claim 1, wherein the only operational members for a user whereby the display contrast can be adjusted consists of a power switch and a coordinate input device.

8. An information processing apparatus according to claim 1, wherein said second predetermined period of time measured by said measuring means is set to be shorter than said first predetermined period of time measured by said measuring means.

9. An information processing apparatus according to claim 1, wherein said value changing means changes the display contrast value stored in said storage means by adding 1 to the display contrast value if the display contrast value is below an allowable maximum display contrast of the apparatus; by subtracting 1 from the display contrast value when the display contrast value reaches the allowable maximum display contrast of the apparatus; or by adding 1 to the display contrast value when the display contrast value reaches an allowable minimum display contrast of the apparatus.

10. An information processing apparatus according to claim 1, wherein said value changing means changes the display contrast value stored in said storage means by setting an allowable minimum display contrast of the apparatus as the display contrast value when the display contrast reaches an allowable maximum display contrast of the apparatus.

11. An information processing apparatus according to claim 1, wherein said value changing means changes the display contrast value stored in said storage means by setting an allowable maximum display contrast of the apparatus as the display contrast value when the display contrast reaches an allowable minimum display contrast of the apparatus.

12. An information processing apparatus according to claim 1, wherein said value changing means changes the display contrast value stored in said storage means by restoring an initial display contrast value.

13. An information processing apparatus according to claim 1, wherein the duration of the second predetermined period of time is set to equal the duration of the first predetermined period of time if adjustment of the display contrast is requested.

14. An information processing apparatus for controlling display contrast of a display screen based on a stored display contrast value, said information processing apparatus comprising:
   a display screen;
   storage means for storing a display contrast value;
   display control means for displaying display contrast setting information based on the stored display contrast value on said display screen when a display contrast adjustment processing is activated in accordance with a request for a display contrast adjustment procedure;
   input means for inputting, by manipulation of a user, data using the display contrast setting information displayed on said display screen in order to change the display contrast value;

measuring means for measuring a time of no data input by said input means;

value changing means for changing the display contrast value stored in said storage means after a first predetermined period of time measured by said measuring means elapses or when the data is inputted by said input means;

changing means for changing the display contrast of said display screen based on the display contrast value changed by said value changing means;

a pre-adjusted contrast value storage means for storing the display contrast value before the display contrast adjustment processing is activated; and requesting means for requesting the cancellation of the display contrast adjustment processing; wherein the display contrast of said display screen is controlled based on the display contrast value stored in said pre-adjusted contrast value storage means when the cancellation of the display contrast adjustment processing is requested by said requesting means.

15. An information processing apparatus according to claim 14, wherein said display screen includes a liquid crystal display device.

16. An information processing apparatus according to claim 14, wherein said input means comprises a coordinate input device.

17. An information processing apparatus according to claim 14, wherein said information processing apparatus is a portable apparatus.

18. An information processing apparatus according to claim 14, wherein said input means consists of a coordinate input device.

19. An information processing apparatus according to claim 14, wherein the only operational members for a user whereby the display contrast can be adjusted consists of a power switch and a coordinate input device.

20. A contrast adjustment method for controlling the display contrast of a display screen based on a stored display contrast value, said contrast adjustment method comprising the steps of:

displaying display contrast setting information based on the stored display contrast value on the display screen when a display contrast adjustment processing is activated in accordance with a request for a display contrast adjustment procedure;

inputting, by manipulation of a user, data using the display contrast setting information displayed on the display screen in order to change the display contrast values;

measuring a time of the no data input in said inputting step;

changing the stored display contrast value when a first predetermined period of time measured in said measuring step elapses or when the data is input in said inputting step; and changing the display contrast of the display screen based on the display contrast value changed in said changing step, wherein after said changing step changes the display contrast, said measuring step resumes measuring and when a second predetermined period of time measured by said measuring step elapses, said value changing step changes the stored display contrast value.

21. A contrast adjustment method according to claim 20, wherein said display screen includes a liquid crystal display device.

22. A contrast adjustment method according to claim 20, wherein a coordinate input device is used in the inputting step.

23. A contrast adjustment method according to claim 20, wherein the display contrast adjustment processing is performed when the main power is supplied.

24. A contrast adjustment method according to claim 20, wherein the only operational members for a user whereby the display contrast can be adjusted consists of a power switch and a coordinate input device.

25. A contrast adjustment method according to claim 20, wherein said second predetermined period of time measured by said measuring step is set to be shorter than said first predetermined period of time measured by said measuring step.

26. A contrast adjustment method according to claim 20, wherein said value changing step changes the stored display contrast value by adding 1 to the stored display contrast value if the stored display contrast value is below an allowable maximum display contrast of the display screen; by subtracting 1 from the stored display contrast value when the stored display contrast value reaches the allowable maximum display contrast of the display screen; or by adding 1 to the stored display contrast value when the stored display contrast value reaches an allowable minimum display contrast of the display screen.

27. A contrast adjustment method according to claim 20, wherein said value changing step changes the stored display contrast value by setting an allowable minimum display contrast of the display screen as the stored display contrast value when the display contrast reaches an allowable maximum display contrast of the display screen.

28. A contrast adjustment method according to claim 20, wherein said value changing step changes the stored display contrast value by setting an allowable maximum display contrast of the display screen as the stored display contrast value when the display contrast reaches an allowable minimum display contrast of the display screen.

29. A contrast adjustment method for controlling the display contrast of a display screen based on a stored display contrast value, said contrast adjustment method comprising the steps of:

displaying display contrast setting information based on the stored display contrast value on the display screen when a display contrast adjustment processing is activated in accordance with a request for a display contrast adjustment procedure;

inputting, by manipulation of a user, data using the display contrast setting information displayed on the display screen in order to change the display contrast value;

measuring a time of the no data input in said inputting step;

changing the stored display contrast value when a first predetermined period of time measured in said measuring step elapses or when the data is input in said inputting step; and changing the display contrast of the display screen based on the display contrast value changed in said changing step;

storing the display contrast value before the display contrast adjustment processing is activated;

requesting the cancellation of the display contrast adjustment processing; and controlling the display contrast of the display screen based on the stored display contrast value when the cancellation of the display contrast adjustment processing is requested in said requesting step.

30. A contrast adjustment method according to claim 29, wherein said display screen includes a liquid crystal display device.

31. A contrast adjustment method according to claim 29, wherein a coordinate input device is used in the inputting step.

32. A contrast adjustment method according to claim 29, wherein the display contrast adjustment processing is performed when the main power is supplied.

33. A contrast adjustment method according to claim 29, wherein the only operational members for a user whereby the display contrast can be adjusted consists of a power switch and a coordinate input device.

* * * * *

UNITED STATES PATENT AND TRADEMARK OFFICE
CERTIFICATE OF CORRECTION

| | |
|---|---|
| PATENT NO. | : 7,158,142 B1 |
| APPLICATION NO. | : 09/568691 |
| DATED | : January 2, 2007 |
| INVENTOR(S) | : Ryoji Fukua |

It is certified that error appears in the above-identified patent and that said Letters Patent is hereby corrected as shown below:

COLUMN 2:

Line 53, "invention." should read --invention;--.

COLUMN 3:

Line 16, "carrying" should read --carrying out--.

COLUMN 9:

Line 15, "processing;" should read --processing,--.
Line 49, "values;" should read --value;--.

COLUMN 10:

Line 59, "and" should be deleted.

Signed and Sealed this

Fifth Day of August, 2008

JON W. DUDAS
*Director of the United States Patent and Trademark Office*